United States Patent
Nair et al.

(10) Patent No.: US 9,844,758 B2
(45) Date of Patent: Dec. 19, 2017

(54) SEPARATION OF WATER USING A MEMBRANE

(71) Applicant: The University of Manchester, Manchester (GB)

(72) Inventors: Rahul Nair, Manchester (GB); Peter Budd, Manchester (GB); Andre Geim, Manchester (GB)

(73) Assignee: The University of Manchester, Manchester (GB)

( * ) Notice: Subject to any disclaimer, the term of this patent is extended or adjusted under 35 U.S.C. 154(b) by 0 days.

(21) Appl. No.: 14/421,606

(22) PCT Filed: Aug. 14, 2013

(86) PCT No.: PCT/GB2013/052160
§ 371 (c)(1),
(2) Date: Feb. 13, 2015

(87) PCT Pub. No.: WO2014/027197
PCT Pub. Date: Feb. 20, 2014

(65) Prior Publication Data
US 2015/0231577 A1   Aug. 20, 2015

(30) Foreign Application Priority Data
Aug. 15, 2012   (GB) .................... 1214565.2

(51) Int. Cl.
*B01D 71/02*   (2006.01)
*B01D 61/36*   (2006.01)
(Continued)

(52) U.S. Cl.
CPC ......... *B01D 71/024* (2013.01); *B01D 61/362* (2013.01); *B01D 69/10* (2013.01);
(Continued)

(58) Field of Classification Search
None
See application file for complete search history.

(56) References Cited

U.S. PATENT DOCUMENTS

| | | | | |
|---|---|---|---|---|
| 3,457,171 A | * | 7/1969 | Flowers | B01D 67/0004 138/125 |
| 4,983,304 A | * | 1/1991 | Tsugita | B01D 71/08 210/500.28 |

(Continued)

FOREIGN PATENT DOCUMENTS

| | | |
|---|---|---|
| CN | 102166844 A | 8/2011 |
| CN | 102173145 A | 9/2011 |

(Continued)

OTHER PUBLICATIONS

Chen, et al. "Self-Assembled Free-Standing Graphite Oxide Membrane", Advanced Materials, vol. 21, No. 29, Aug. 7, 2009, pp. 3007-3011.

(Continued)

*Primary Examiner* — Krishnan S Menon
*Assistant Examiner* — Ryan B Huang
(74) *Attorney, Agent, or Firm* — Wilmer Cutler Pickering Hale and Dorr LLP

(57) ABSTRACT

This invention relates to uses of graphene oxide, and in particular graphene oxide on a porous support, and a membrane comprising these materials. This invention also relates to methods of dehydration, which include vapour phase separation and pervaporation. Pervaporation is a method of separating mixtures of liquids using a membrane. Pervaporation consists of two basic steps: permeation of the permeate through the membrane and evaporation of the permeate from the other side of the membrane. Pervaporation is a mild which can be used to separate components which would not (Continued)

survive the comparatively harsh conditions needed for distillation (high temp, and/or low pressure).

14 Claims, 5 Drawing Sheets

(51) Int. Cl.
   *B01D 69/10* (2006.01)
   *C02F 1/44* (2006.01)
(52) U.S. Cl.
   CPC ............ *B01D 71/021* (2013.01); *C02F 1/448* (2013.01); *B01D 2313/06* (2013.01); *B01D 2325/20* (2013.01)

(56) References Cited

U.S. PATENT DOCUMENTS

| | | | |
|---|---|---|---|
| 6,156,451 A * | 12/2000 | Banerjee | H01M 8/0291 156/228 |
| 2012/0255899 A1 | 10/2012 | Choi et al. | |

FOREIGN PATENT DOCUMENTS

| | | |
|---|---|---|
| CN | 102600734 | 7/2012 |
| CN | 102614788 A | 8/2012 |
| CN | 102671549 A | 9/2012 |
| CN | 103011152 A | 4/2013 |
| EP | 0253047 A1 | 1/1988 |
| FR | 1469079 | 2/1967 |
| JP | 2004217450 A | 8/2004 |
| WO | WO-2012037090 A2 | 3/2012 |
| WO | WO-2013039895 A1 | 3/2013 |

OTHER PUBLICATIONS

International Search Report with Written Opinion issued in corresponding International Application No. PCT/GB2013/052160, dated Nov. 20, 2013, 13 pages.
Lomax, "Breathable Polyurethane Membranes for Textile and Related Industries", Journal of Materials Chemistry, vol. 17, May 22, 2007, pp. 2775-2784.
Wang, et al. "Novel GO-blended PVDF Ultrafiltration Membranes" Desalination, Elsevier, Amsterdam, NL, vol. 299, May 10, 2012, pp. 50-54.
Boehm, et al., "Graphite Oxide and Its Membrane Properties." Journal de Chimie Physique (France) Merged with Rev. Gen. Colloides to form J. Chim. Phys. Rev. Gen. Colloides vol. 58, pp. 141-147, (1961).
Clauss, A. and Hofmann, U., "Graphite oxide membranes for measuring the partial pressure of Steam", Angewandte Chemie, vol. 68, No. 16, p. 522 (1956) [machine translation 3 pages].
Nair et al., "Unimpeded permeation of water through helium-leak-tight graphene-based membranes," Science, Voi. 335, pp. 442-444, Jan. 12, 2012.
Wenjun Li, "Graphene Oxide Moisture Permeable Membrane", Membrane Science and Technology, vol. 32, No. 3, p. 51: the last paragraph, Jun. 30, 2012, (explanation of relevance for reference provided in Jun. 13, 2016 Office Action from Chinese application 201380043474.8, 30 pages).
Office Action and Search Report dated Jun. 13, 2016, in Chinese Application No. 201380043474.8, 8 pages (full translation provided, 13 pages).

* cited by examiner

SEPARATION OF WATER USING A MEMBRANE

CROSS-REFERENCE TO RELATED APPLICATIONS

This application is a national stage application of International Application No. PCT/GB2013/052160 filed on Aug. 14, 2013 which claims the benefit of the priority of United Kingdom Patent Application No. 1214565.2, filed on Aug. 15, 2012, the disclosures of each of which are hereby incorporated by reference in their entirety.

This invention relates to uses of graphene oxide, and in particular graphene oxide on a porous support, and a membrane comprising these materials. This invention also relates to methods of dehydration, which include vapour phase separation and pervaporation.

BACKGROUND

Separation of water from other substances is of great utility in a wide variety of contexts.

The separation of water vapour from other gases can be achieved using hydrophilic membranes, which allow water to pass through but not the gas which is being purified.

'Raw' natural gas contains a number of impurities, including water vapour which must be removed before it can be used. Likewise, naturally occurring helium gas often contains water vapour which must be removed for many applications. Crude oil also frequently needs to be dehydrated as part of the refining process.

Water vapour can interfere with gas phase detector systems and pre-separation of water from the gaseous mixture can improve the sensitivity and longevity of such systems. The removal of water vapour from these and other gaseous systems may be advantageous and is an aim of the invention.

Many industries use the removal of water as a way of concentrating mixtures. Thus, the food industry will concentrate fruit juices, sugar, and milk (e.g. before cheese production) and many other industries (e.g. the galvanic industry) will concentrate their waste products in order to reduce the cost of transport and/or disposal.

Pervaporation is a method of separating mixtures of liquids using a membrane. Pervaporation consists of two basic steps: permeation of the permeate through the membrane and evaporation of the permeate from the other side of the membrane. Pervaporation is a mild process. Thus, it can be used to separate components which would not survive the comparatively harsh conditions needed for distillation (high temp, and/or low pressure). It is a low-energy alternative to distillation.

Pervaporation can be used to remove trace quantities of an impurity from a liquid. For example, hydrophilic membranes can be used to remove water from organic solvents, and can provide the solvent in a higher purity than conventional means. One particular use is to purify compounds which form azeotropic mixtures with water, such as ethanol and isopropanol.

Hydrophilic membranes can be used for the removal of water from fermentation broths or from condensation reactions such as esterification.

The currently most preferred hydrophillic membranes for pervaporation are zeolites such as those based on zeolite A. These materials have a number of drawbacks. As zeolites are polycrystalline, their formation into a stable membrane can be problematic. Zeolites dissolve in relatively weakly acidic conditions (below about pH 4) and this can limit the possible applications. It is also hard to find an effective support for such membranes.

Polymeric membranes are also widely used, but they are generally less-selective.

Graphene is believed to be impermeable to all gases and liquids. Submicrometer thick membranes made from graphene oxide are impermeable to most liquids, vapours and gases, including helium. However, an academic study has shown that, surprisingly, graphene oxide membranes which are effectively composed of graphene oxide having a thickness around 1 µm are permeable to water even though they are impermeable to helium. These graphene oxide sheets allow unimpeded permeation of water ($10^{10}$ times faster than He) (Nair et al. *Science*, 2012, 335, 442-444). The paper does not, however, disclose any workable membranes made from graphene oxide sheets nor does it disclose any practical applications of this material as a membrane.

The present invention aims to provide a means for dehydration (i.e. the separation of water or water vapour from a system) which is effective at a wider range of conditions than existing technologies. The system from which water is to be separated may be a mixture of gases or it may be a mixture of one or more liquids contaminated by water (e.g. a fuel system).

The present invention also aims to provide a means for dehydration which is as selective or more selective than existing technologies.

The present invention also aims to provide a means for dehydration which uses a material that is cheaper and/or easier to prepare in bulk than the materials of existing technologies.

The present invention also aims to provide a means for dehydration which is more efficient, in terms of yield or in terms of energy input than existing technologies.

The present invention also aims to provide a means for dehydration which is durable and has good longevity. This allows the material to be reused and/or recycled. This is particularly relevant for industrial uses.

The present invention satisfies some or all of the above aims.

We have found that sheets of graphene oxide, when combined with a porous support, can be used to selectively separate water or water vapour from fluid systems such as a gas, a liquid or mixtures of gases and liquids.

BRIEF SUMMARY OF THE DISCLOSURE

In a first aspect of the present invention is provided the use of a graphene oxide membrane for the dehydration of a product, wherein the graphene oxide membrane comprises a layer of graphene oxide on a porous support.

Dehydration comprises the separation of water from a product.

In an embodiment, the separation is by pervaporation.

In an alternative embodiment, the separation is by gas or vapour phase separation.

In an embodiment, the use is in a detector system. The species being detected may be water or it may be the dehydrated liquid or gas. In this case, it may be that, were it present, water would interfere in the detection of the dehydrated liquid or gas.

In an alternative embodiment, the use is in gas drying. In an alternative embodiment, the use is in gas humidification.

In an embodiment, the use is in a concentration step.

In an embodiment, the use is a continuous process.

In a second aspect of the present invention is provided a method of separating water from a product, the method comprising:

contacting the mixture of water and product with a first surface of a graphene oxide membrane, wherein the graphene oxide membrane comprises a layer of graphene oxide on a porous support;

removing the water from a second surface of the graphene oxide membrane.

The graphene oxide is provided on a porous support. This means that the graphene oxide is physically supported by the porous support, but does not impose any limitation on the position of the porous support relative to the position of the layer of graphene oxide. Thus, the porous support may be provided on one side of the layer of graphene oxide, this being the "top" or "bottom" side, or indeed there may be more than one porous support associated with the layer of graphene oxide, in which case the porous supports may be disposed on different sides of the layer of graphene oxide or they may be on the same side.

In an embodiment, the method of separating is a method of separating by pervaporation.

In an embodiment, the method of separating is a method of separating by gas or vapour phase separation.

In an embodiment, the method is continuous.

One effect of removing water from a product is that the product necessarily becomes more concentrated. This could be the purpose of the use or method of the invention.

Without wishing to be bound by theory, it is believed that the water passes through the layer of graphene oxide due to capillary action or other surface forces between individual water molecules and the graphene oxide. This unusual permeation property is due to the unique structure of GO membrane. The speed of water molecules inside graphene oxide membranes is high due to the low frictional graphitic structure of the membrane. It is believed that this mechanism is not available to other compounds. It is not necessary to pressurise the system i.e. the product which is to be dehydrated in order to effect dehydration as the water is able to pass selectively through the membrane. Separation may however be effected under the influence of pressure and/or the application of a vacuum. The water which is recovered from the "far" side of the membrane after the water has passed through the membrane and been released from the second surface of the membrane can be removed using a variety of methods or it can simply be left or allowed to evaporate. Active removal of the separated water is not essential to the functioning of the membrane in the dehydration process, i.e. in many cases no specific action is required.

In a third aspect of the present invention, there is provided, a composite semi-permeable membrane in the form of a laminar structure comprising at least a layer of graphene oxide and a layer of porous support.

The term "semi-permeable" refers to the fact that the composite graphene oxide membrane is impermeable to all gases and liquids but it can selectively allow permeation of water whilst being impermeable to gases, such as helium, and other vapours and liquids. Thus, in this case the membrane is exclusively pervious to water and water vapour. It also refers to the fact that composite membrane as a whole can, in some embodiments, allow selective passage of a limited number of other materials such as ethanol, ethanol and propanol, and similar small polar molecules but remains impermeable to other gases and liquids.

We have found that the nature of the porous support on to which the graphene oxide is deposited is important to the overall performance of the graphene oxide membrane composite structure and its ability to allow permeation. In other words, the porous support can modulate the ability of the overall graphene oxide membrane to allow selective permeation of liquid or vapour such as water. However, other small polar molecules may permeate through the membrane or may be prevented entirely by the membrane. In this respect the term "small polar molecules" specifically excludes water. The graphene oxide membrane according to the invention will always allow the permeation of water and the membrane materials thus govern the extent to which other small polar molecules such as C1-4 alcohols and the like will permeate or be excluded.

In an embodiment, the porous support is an inorganic material. Thus, the porous support (e.g. membrane) may comprise a ceramic. Preferably, the support is alumina, zeolite, or silica. In one embodiment, the support is alumina. Zeolite A can also be used. Ceramic pervaporation membranes have also been produced in which the active layer is amorphous titania or silica produced by a sol-gel process.

In an alternate embodiment, the support is a polymeric material. Preferably it is PTFE, PVDF or CYCLOPORE™ polycarbonate. In an embodiment, the porous support (e.g. membrane) may comprise a polymer. In an embodiment, the polymer may comprise a synthetic polymer. Historically, commercial pervaporation membranes were generally based on poly(vinyl alcohol) and more recently, polyimides have been used. These can be used in the invention. Alternatively, the polymer may comprise a natural polymer or modified natural polymer. Thus, the polymer may comprise a polymer based on cellulose.

In another embodiment, the porous support (e.g. membrane) may comprise a carbon monolith.

In an embodiment, the graphene oxide layer has a thickness of no more than a few tens of µm, and ideally is less than about 100 µm. Preferably, it has a thickness of 50 µm or less, more preferably of 10 µm or less, and yet more preferably is less 5 µm. In some cases it is preferably is less than about 1 µm thick. For most membrane applications, the active layer is made as thin as possible (less than 1 micrometer) to increase the flux.

In an embodiment, the porous support has a surface roughness which is the same as or smoother than as PTFE. Preferably, the surface roughness is less than that of PTFE i.e. it is smoother.

Preferably, the porous support is as smooth as Anodisc alumina. Normally, one might think of PTFE as smooth and alumina as rough. However, the reference to alumina here refers specifically to the very special case of "Anopore"™ alumina.

In an embodiment, the choice of the porous support is determined by the relative smoothness of its surface and the identity of the material which is intended to be allowed to permeate or to be stopped by the membrane structure.

We can also modify the permeability of GO and hence of the membrane as a whole by modifying not only surface roughness but also other parameters (eg. GO flake structure. For example, if flat GO is replaced by corrugated or crumpled GO it is possible to control the pore size. This will allow passage of other small molecules also through GO membranes. This provides a means to alter the selectivity of permeation of the GO coating and consequently also the membrane as a whole.

In an embodiment, the porous support layer has a thickness of no more than a few tens of µm, and ideally is less than about 100 µm. Preferably, it has a thickness of 50 µm or less, more preferably of 10 µm or less, and yet more preferably is less 5 μm. In some cases it may be less than about 1 μm thick though preferably it is more than about 1 μm.

For ceramic pervaporation membranes, the support may be rather thick (e.g., tubular structures of 7 mm internal diameter, 10 mm outside diameter, i.e. thickness 3 mm) in order to achieve sufficient mechanical strength. However, polymeric membranes are generally much thinner (e.g., for hydrophilic polyethersulfone membranes, the thicknesses are in the range 90-180 micrometers for some applications, whilst thicknesses in the range 110-150 micrometers are quoted for other applications. Also, a polymeric support may be "asymmetric", with a large pore size substructure and smaller pores at one surface. Thin polymeric supports may also be further supported on, e.g., a fabric.

In an embodiment, the ratio of the thicknesses of the graphene oxide layer to porous support layer is in the range from 10:1 to 1:10. Usually, the thickness of the graphene oxide layer is less than the thickness of the porous support layer. The ratio is ideally from 1:1 to 1:10, and preferably is from 1:2 to 1:10. However, in some applications the ratios may be reversed, with the preference being for a thicker graphene oxide layer.

In an alternative embodiment, the porous support layer is considerably thicker i.e. from 10 to 1000 times thicker than the graphene oxide layer. In this embodiment, the above quoted ratios for the relative thicknesses of the graphene oxide layer and the porous support layer do not apply. This is because the graphene oxide layer must usually have a thickness of no more than 100 μm.

In an embodiment, the porous support is no more hydrophobic than PTFE, and preferably it is more hydrophilic than PTFE. In this respect, Anopore™ alumina is better as a support than a polymeric material such as PTFE is. The choice of porous support will thus depend on the hydrophilicity of the material used as the support in a graphene oxide membrane composite structure and the identity of the material which is intended to be allowed to permeate. The skilled person has a wide variety of more hydrophilic polymers than PTFE which are available for use in the present invention.

Hydrophilicity is a well understood term and the hydrophilicity of a material is easily determined by conventional methods. For example, hydrophilicity may be quantified in terms of, e.g., water contact angle or surface energy. For commercial materials such information is directly available from suppliers. Typical quoted values of water contact angle are: PTFE 123 deg; PVDF 111 deg; polycarbonate 70 deg., polyethersulfone 54 deg. The measurement of this angle can be performed using a Kruss drop analyser which is widely used the fields of both chemistry and materials.

The effects of smoothness and hydrophilicity can be additive in some cases, or they may act independently; this is substrate dependent. However, the above-described general principles still apply in terms of the separate, or combined, effects of increasing smoothness and increasing hydrophilicity on permeation. Without wishing to be bound by theory, we consider that the smoothness of the substrate is more important for GO coating than hydrophilicity is. This may be because graphene always tries to follow the structure of the substrate.

In some cases the effect of substrate hydrophobicity on GO coating quality can be reduced significantly in importance relative to the surface smoothness effects by using GO dispersions in other polar solvents (eg. methanol, ethanol, NMP, DMF, chloroform, etc)

We are thus able to produce a membrane whose permeation characteristics can be tailored to allow passage of water and/or to allow passage of or exclude the passage of other small polar solvents such as methanol, ethanol and propanol whilst remaining completely impermeable to other fluids such as gases and liquids. In this respect, the term "small polar molecules" specifically excludes water.

The graphene oxide membrane according to the invention will always allow the permeation of water and the membrane materials thus govern the extent to which other small polar molecules such as C1-4 alcohols and the like will permeate the membrane or be excluded by the membrane whilst allowing water to pass through.

In some embodiments, it is possible to produce a membrane which is able to separate molecules of identical weight such as different isomers of the same compounds. For example, we have found higher flux for 1-propanol than 2-propanol and thus it may be possible to use the membrane either to separate completely isomers such as these from one another, or to enrich a mixture of the isomers in one particular isomer. Thus for example, a linear isomer may be separated from a branched isomer.

In one embodiment, methanol and ethanol are small polar molecules which are of particular interest in terms of the ability to allow under certain circumstances selective transmission through the membrane. In an alternative embodiment, denial of passage through the membrane structure of small polar molecules such as these in their entirety is desirable.

We can also tailor the nature of the GO coating itself. This is a useful feature of the invention. Thus the permeability of the GO membrane can also be modified by modifying the GO coating itself to alter the spacing between the GO sheets. Permeation is purely dependent on the interlayer distance between graphene oxide sheets. We can tailor the interlayer distance by inserting (intercalating) GO with other atoms/molecules. If the interlayer distance is less than 0.7 nm (fully dried state) it completely blocks everything including water. In the wet conditions interlayer distance can be vary up to 1.3 nm depending on the hydration level.

In the fully wet conditions, molecular permeation through GO is depends on the solubility of that molecule in water and the size of the molecule. If the size of the molecule is less than the size of the capillary diameter then it permeatse with water; otherwise it will get physically blocked by the capillary.

Membranes of this type will have a number of uses in diverse applications in gas drying and liquid drying. The membranes of the third aspect can be used in the uses and methods described respectively in the first and second aspects of the invention above.

The following embodiments may also apply to any of the first second and third aspects of the invention referred to above. These individual embodiments may also be combined with one or more other embodiments in any combination.

The porous support may comprise a layer of porous membrane.

The product may comprise one or more compounds. In an embodiment, at least some of the product is in the form of a gas or a vapour. Thus, it may be that the product is substantially in the form of a gas or vapour. Or, it may be that the product is substantially in the form of a liquid. In an embodiment, at least one compound of the product is entirely in the form of a gas or a vapour. In an embodiment, the product is entirely in the form of a gas or a vapour.

In an embodiment, at least some of the water to be separated is in the form of water vapour. Thus, it may be that the water is substantially in the form of a gas or vapour. Or, it may be that the water is substantially in the form of a liquid. In an embodiment, the water is entirely in the form of a gas or a vapour.

In a specific embodiment, the product and the water are entirely in the form of a gas or a vapour.

In another specific embodiment, the product and the water are substantially in the form of a liquid.

In embodiments in which the layer of graphene oxide is supported on a layer of porous membrane, the graphene oxide membrane on a porous support is a composite material. The material will comprise one or more layers of graphene oxide and one or more layers of porous membrane in the form of a laminate or thin layer composite. It will have two surfaces, a first surface which is in contact with the product/water mixture and into which the water (and, in some embodiments, product) will enter the composite material and a second surface from which the water (and, in some embodiments, product) will exit the composite material.

Each surface may be the outer surface of a graphene oxide layer or a porous membrane layer.

In an embodiment, the first surface of the composite material is the outer surface of a graphene oxide layer and the second surface is the outer surface of a porous membrane layer. In an alternative embodiment, the first surface is the outer surface of a porous membrane layer and the second surface is the outer surface of a graphene oxide layer.

In some embodiments, the or each graphene oxide layer is sandwiched between two layers of porous membrane. Thus, in another embodiment, both surfaces of the composite material are the outer surfaces of a porous membrane layer.

In some alternative embodiments, the or each porous membrane layer is sandwiched between two layers of graphene oxide. Thus, in another embodiment, both surfaces of the composite material are the outer surfaces of graphene oxide layer.

In its simplest form, the graphene oxide membrane comprises only a layer of graphene oxide and a layer of a porous membrane. However, the laminate structure, when composed of three or more layers may be symmetrical in the case of alternative layers of graphene oxide and porous membrane as described above or it may have any arrangement of different layers of graphene oxide and porous membrane.

Throughout this specification, the term 'layer' when applied to graphene oxide, refers to a layer which may itself comprise any number of individual molecular layers of graphene oxide. Thus, the 'layer' referred to in this specification is not necessarily a single molecular layer.

Thus, in an embodiment, the or each graphene oxide layer is between 100 nm and 10 µm thick. In an embodiment, the composite material comprises a single graphene oxide layer. In another embodiment, the composite material comprises a single graphene oxide layer between 100 nm and 10 µm thick. This thickness of material represents the optimum balance between porosity and selectivity.

The porous support should be porous enough not to interfere with water transport but have small enough pores that graphene oxide platelets cannot enter the pores. Thus, the porous support must be water permeable. In an embodiment, the pore size must be less than 1 µm. In an embodiment, the support has a uniform pore-structure. Examples of porous membranes with a uniform pore structure are electrochemically manufactured alumina membranes (e.g. those with the trade names: ANOPORE™, ANODISE™).

In an embodiment, the composite material may comprise two or more layers of porous membrane. In this embodiment, the two or more layers may comprise different materials. 'Different materials' are meant to include materials with the same chemical composition but differing forms or differing structures, e.g. differing pore sizes. Of course, 'different materials' also includes materials with different chemical compositions. The two or more layers may comprise two layers with different pore sizes In an alternative embodiment, the two or more layers may comprise the same material.

The porous support may be in the form of a flat sheet, a hollow fibre, a tube or a monolith structure. The graphene oxide layer may thus be presented as a coating on one or both of the surfaces of porous support.

In embodiments of the invention, the product is a mixture of chemical entities which contains, or is suspected to contain, at least one target compound.

In a more specific embodiment, the product is a gaseous mixture of chemical entities which contains, or is suspected to contain, at least one target compound.

In an embodiment, the at least one target compound is harmful. In a further embodiment, the at least one target compound is harmful to the environment. In an alternative embodiment, the at least one target compound is harmful to animals, and in particular humans. The at least one target compound may be toxic.

In an embodiment, the product is natural gas. In an alternative embodiment, the product is helium. In yet another alternative, the product is crude oil.

In an embodiment, the product is a fermentation broth or has been extracted from a fermentation broth.

In an embodiment, the fermentation broth has a pH less than about 4.

The product may comprise an alcohol, e.g. a $C_1$-$C_{15}$ alcohol and more particularly a $C_1$-$C_6$ alcohol. Thus, the product may comprise ethanol. The product may also comprise methanol. The product may also comprise butanol.

The product may comprise one or more alkanes, e.g. one or more $C_1$-$C_{15}$ alkanes. The product may comprise one or more $C_1$-$C_{10}$ alkanes.

The product may also comprise one or more organic molecules selected from acetone; acetaldehyde; acetic acid; formic acid; propanoic acid.

In an alternative embodiment, the product is a complex mixture of compounds. In such cases the purpose of the use or method of the invention may simply be the concentration of the product. Thus, the product may be selected from: a food stuff (e.g. fruit juice, sugar, milk) or an industrial product or waste stream, (e.g. those arising from the galvanic industry).

In an embodiment, a vacuum or sweep gas is applied to the second surface of the graphene oxide membrane to remove the water.

In an embodiment, the water is allowed to evaporate and no specific action is taken to remove the water.

BRIEF DESCRIPTION OF THE DRAWINGS

Embodiments of the invention are further described hereinafter with reference to the accompanying drawings, in which.

DETAILED DESCRIPTION

Figure 1:
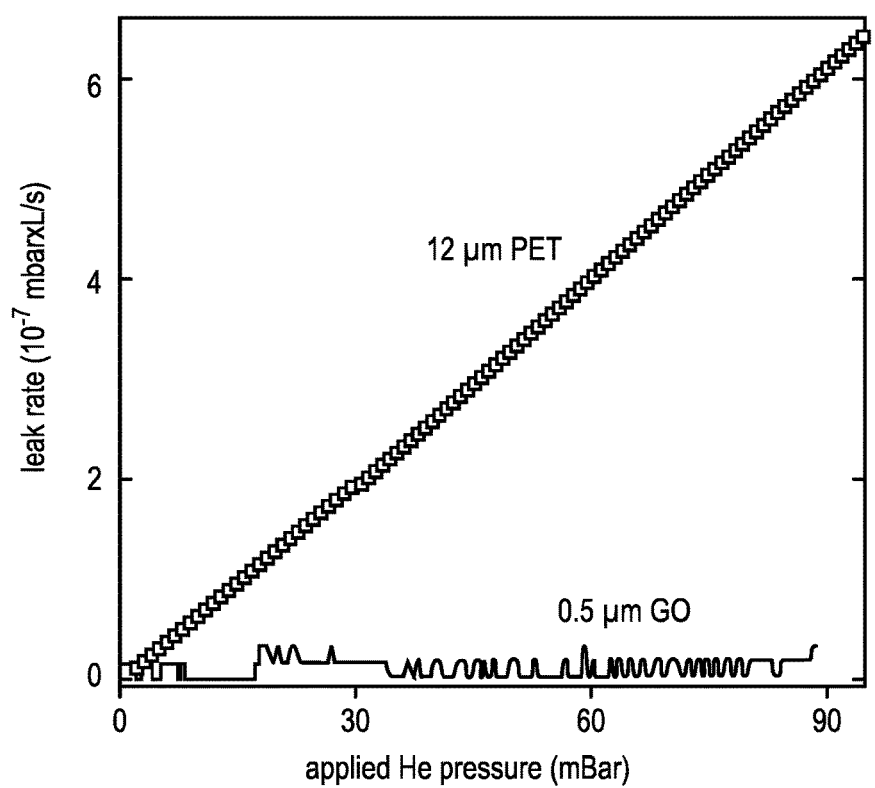
FIG. 1 shows He-leak measurements for a freestanding submicrometer-thick GO membrane and a reference PET film (normalized per square centimeter).

This invention relates to the separation of water from other chemical entities. In the context of this application, 'separation' can be understood to mean that the proportion of the product mixture which is water is lower after the separation than it was before the separation. In some cases, water will be substantially or even entirely removed from the product. In other cases, water will be partially removed from the product. The water which has been separated will, in some cases, be substantially or entirely pure (i.e. free of the product). In other cases, the water will contain some product.

The invention relates to the separation of water from one or more products. The term 'product' may mean any chemical species. In an embodiment, a product may be any gas, e.g. an elemental gas. A product may be an organic molecule. Thus, a product may be any species which is a gas at standard temperatures and pressures, e.g. $H_2$, $N_2$, $O_2$, methane, ethane, ethene, ethyne, ethylene oxide, propane, butane, He, Ar, Ne, $CO_2$, CO $H_2S$, $SO_2$, $NO_x$, etc. A product may be a liquid at standard temperatures and pressure such as pentane, hexane, decane, ethanol, methanol, propanol, acetone, butanol etc. The water may be separated from any single product, or a mixture of any two, three or four products or a complex mixture of many products.

In some embodiments, at least some of any one or more products are in the form of a gas or a vapour. In other words, a product may be partially in a gas or vapour form and partially in a liquid form. It may be that all of the products are partially in the gas or vapour form and partially in a liquid form. It may also be that one or more products are entirely in the gas or vapour form and one or more other products are partially in the gas or vapour form and partially in a liquid form. Thus, if at least some of the water is in the form of water vapour, then that means that the water is partially in the liquid phase and partially in the form of water vapour. It is within the scope of this invention that any product or water may be present in the gas or vapour phase, the liquid phase and the solid phase. Likewise, it is within the scope of this invention that any product may be partially present in the solid phase and partially present in the gas or vapour phase.

It is within the scope of this invention that the water and one or more products are in the liquid phase and are in contact with the porous membrane and/or the graphene oxide.

Support materials with pore size in the range 0.1 to 10 micrometers are commonly referred to as microfiltration membranes. Membrane materials with pore size in the range 0.001 to 0.1 micrometers are commonly referred to as ultrafiltration membranes. However, porous structures having a pore size in the range 100 nm (0.1 micrometers) to 500 nm are also effective in the membranes of the present invention and we have used membranes in the range of 150 nm to 300 nm e.g. 200 nm to demonstrate impermeability even at larger pore sizes (see examples).

The porous membrane may comprise a synthetic polymer. Examples of synthetic polymers include: polysulfones (e.g., PALL HT TUFFRYN®); polyethersulfones (e.g., PALL SUPER®, MILLIPORE EXPRESS®, SARTORIUS PES); polyvinylidene difluoride (PVDF; e.g., PALL FP VERI-CEL™, MILLIPORE DURAPORE®); polypropylene (e.g., PALL GH POLYPRO); acrylic polymers (e.g., PALL VERSAPOR®); polyamide (Nylon) (e.g, PALL NYLAFLO™, SARTORIUS NY); and polytetrafluoroethylene (PTFE; e.g. MILLIPORE OMNIPORE™).

The porous membrane may comprise a natural polymer or modified natural polymer. Examples of natural polymer and modified natural polymer polymers include: cellulose esters (e.g., MILLIPORE MF-MILLIPORE™); cellulose nitrate (e.g., SARTORIUS CN); cellulose acetate (e.g., SARTORIUS CA); and regenerated cellulose (e.g., SARTORIUS RC).

The porous membrane may comprise a carbon monolith. An example of a suitable monolith would be those prepared by carbonization of polymerized high internal phase emulsions (see D. Wang, N. L. Smith and P. M. Budd, Polymer Int., 2005, 54, 297-303).

The porous membrane may comprise an inorganic material. Examples of appropriate inorganic materials include: Aluminum oxide ($Al_2O_3$, Alumina; e.g., ANODISK; ANOPORE™); Metal oxide/ceramic (e.g., VEOLIA WATER SOLUTIONS CERAIVIEM®); Silicon carbide (SiC; e.g., VEOLIA WATER SOLUTIONS CERAMEM®); Zirconium oxide; Silicon dioxide; Titanium dioxide.

The graphene oxide for use in this application can be made by any means known in the art. In a preferred method, graphite oxide can be prepared from natural graphite flakes by treating them with potassium permanganate and sodium nitrate in concentrated sulphuric acid. This method is called Hummers method. Another method is the Brodie method, which involves adding potassium chlorate ($KClO_3$) to a slurry of graphite in fuming nitric acid. For a review see, Dreyer et al. *The chemistry of graphene oxide, Chem. Soc. Rev.*, 2010, 39, 228-240.

Individual graphene oxide (GO) sheets can then be exfoliated by dissolving graphite oxide in water with the help of ultrasound, and bulk residues can then be removed by centrifugation.

The preparation of graphene oxide supported on a porous membrane can be achieved using filtration, spray coating, casting or dip coating techniques. For large scale production of supported graphene based membranes or sheets it is preferred to use spray coating techniques. One benefit of spray coating is that spraying GO solution in water on to the porous support material at an elevated temperature produces a large uniform GO film.

Previously, graphene had been believed to be impermeable to all gases and liquids but in the present application we demonstrate that, surprisingly, a composite structure made from graphene oxide provided on a porous support can selectively allow permeation of water whilst being impermeable to gases, such as helium, and other vapours and liquids. However, we have also found that the properties of the graphene oxide composite as a whole can be modulated so as to allow selective passage of a limited number of other materials by changing the porous support.

We have found that the nature of the porous support on to which the graphene oxide is deposited is important to the overall performance of the graphene oxide membrane composite structure and its ability to allow permeation. In other words, the porous support can modulate the ability of the overall graphene oxide membrane to allow selective permeation of liquid or vapour such as water. However, other small polar molecules may permeate through the membrane or may be prevented entirely by the membrane. In this respect the term "small polar molecules" specifically excludes water.

The graphene oxide membrane according to the invention will always allow the permeation of water and the membrane materials thus govern the extent to which other small polar molecules such as C1-4 alcohols and the like will permeate or be excluded.

One factor governing the permeation is the smoothness of the surface of the porous support. A smooth porous support such as alumina is better at resisting transmission of a small polar molecule such as propanol than a rougher porous support such as PTFE or PVDF (polyvinyldifluoride) is when used with graphene oxide in a graphene oxide membrane composite. Thus the choice of the porous support will be determined in part by the relative smoothness of its surface and the identity of the material which is intended to be allowed to permeate or to be stopped by the membrane structure. Ideally, the support should have a surface roughness which is the same as or less than that of PTFE. Preferably, the surface roughness is less than that of PTFE.

Another important factor is the hydrophilicity of the porous support. A more hydrophilic support performs better in allowing selective permeation of small polar molecules such as propanol when used in combination with graphene oxide than a less hydrophilic support does. In this respect, alumina is better as a support than a polymeric material such as PTFE is if preventing permeation of small polar molecules to a higher degree or totally is the intention. The choice of porous support will thus depend on the hydrophilicity of the material used as the support in a graphene oxide membrane composite structure and the identity of the material which is intended to be allowed to permeate. Ideally, the support should be no more hydrophobic than PTFE, and preferably it is more hydrophilic than PTFE.

We are thus able to produce a membrane whose permeation characteristics can be tailored to allow the passage of water and, in some circumstances, other small polar solvents such as methanol, ethanol and propanol whilst remaining completely impermeable to other fluids such as gases and liquids.

Methanol and ethanol are small polar molecules which are of particular interest in terms of the ability to allow under certain circumstances selective transmission through the membrane. In other cases, denial of passage through the membrane structure of small polar molecules such as these in their entirety is desirable.

Membranes of this type will have a number of uses in applications for gas drying and liquid drying.

EXPERIMENTAL SETUP

Metal containers for permeation experiments were fabricated from an aluminum alloy and sealed by using two O rings. For gravimetric measurements, the containers were specially designed to minimize their mass. The weight loss was monitored by using a computer-controlled precision balance (ADAM Equipment Ltd; accuracy 1 mg). All the gravimetric experiments were carried out in an argon atmosphere in a glove box with a negligible water pressure ($<10^{-3}$ mbar). If the containers were sealed with submicron GO membranes, no weight loss could be detected for any liquid other than water. For the case of an open aperture, evaporation rates for other liquids were higher than for water (for example, $\approx 1.3$, 6.0 and 8.3 mg/h/mm$^2$ for ethanol, hexane and acetone at room temperature (T) respectively).

Example 1

This example relates to the permeation properties of GO. The studied GO membranes were prepared as follows: We employed Hummer's method to obtain graphite oxide that was dispersed in water by sonication to make a stable suspension of GO crystallites. We then used this suspension to produce laminates by spray- or spin-coating. Scanning electron microscopy and x-ray analysis reveal that such GO films have a pronounced layered structure and consist of crystals with typical sizes L of a few micrometers, which are separated by a typical distance d of ~10 Å. For the Example 1 permeation experiments, Cu foils of several centimeters in diameter were uniformly covered with the GO laminates. Then, we chemically etched Cu to produce apertures of diameter D $\approx$1 cm fully covered by freestanding GO films. Finally, a metal container was sealed by using the Cu disks. We studied membranes with thicknesses h from 0.1 to 10 μm. Even submicrometer-thick membranes were strong enough to withstand a differential pressure $\Delta P$ up to 100 mbar.

As an initial test, we filled the containers with various gases under a small overpressure (<100 mbar) and recorded its changes over a period of several days. We observed no noticeable reduction in $\Delta P$ for any tested gas including He, $H_2$, $N_2$, and Ar. This allowed an estimate for the upper limit on their permeation rates Pr as $\approx 10^{-11}$ g/cm$^2$·s·bar, which is close to the value reported for micron-sized "balloons" made from continuous graphene monolayers.

We used mass spectrometry and found no detectable permeation of He. The accuracy was limited only by digital noise of our He spectrometer and a slightly fluctuating background, which yielded Pr<$10^{-12}$ g/cm$^2$·s·bar. Using hydrogen mass spectrometry, no permeation was found either, albeit the accuracy was three orders of magnitude lower than for He, due to a larger background. A 12-μm thick film of polyethylene terephthalate (PET) was used as a reference barrier and exhibited a He leakage rate 1000 times higher than our detection limit (FIG. 1) yielding PET's bulk permeability $\Pi_{He}$=Pr·h$\approx 10^{-11}$ mm·g/com$^2$·s·bar, in agreement with literature values.

Figure 2:
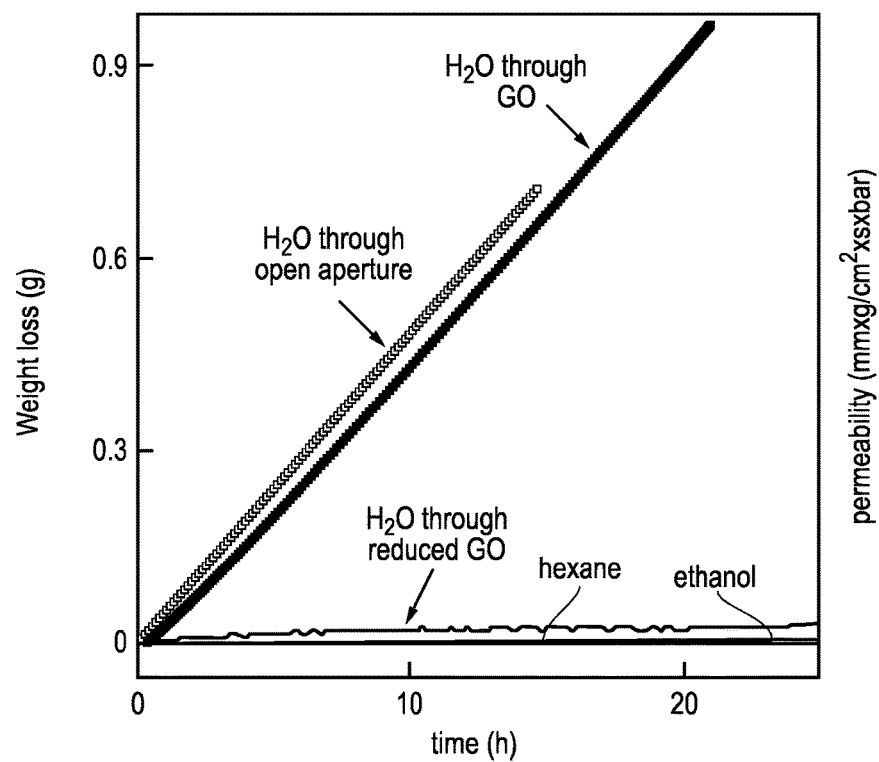
FIG. 2 shows weight loss for a container sealed with a GO film.

To evaluate the permeation barrier for liquid substances, we employed weight-loss measurements. FIG. 2 shows examples for evaporation rates from a metal container with an aperture covered by a 1-μm-thick GO membrane. No weight loss could be detected with accuracy of <1 mg for ethanol, hexane, acetone, decane, and propanol in the measurements lasting several days. This sets an upper limit for their $\Pi$ as $\approx 10^{-11}$ mm·g/cm$^2$·s·bar. We observed a huge weight loss if the container was filled with water.

Moreover, the evaporation rate was practically the same as as through an open aperture i.e. in the absence of the GO film; (h$\approx$1 μm; aperture's area$\approx$1 cm$^2$).

Example 2

This example relates to the permeation properties of GO on a permeable membrane. A 500 nm thick GO layer supported on an Anopore membrane (20 mm diameter) was prepared by vacuum filtration of graphene oxide solution in water through the alumina membrane. The pore size of the Anopore alumina membrane was 200 nm. The permeability of water, ethanol and methanol through the membrane was determined by measuring the weight loss from a metal container sealed with the GO/membrane composite. A comparative experiment was also performed to determine the permeability of water through an Anopore membrane. The measurements were carried out at room temperature and zero humidity.

Figure 3:
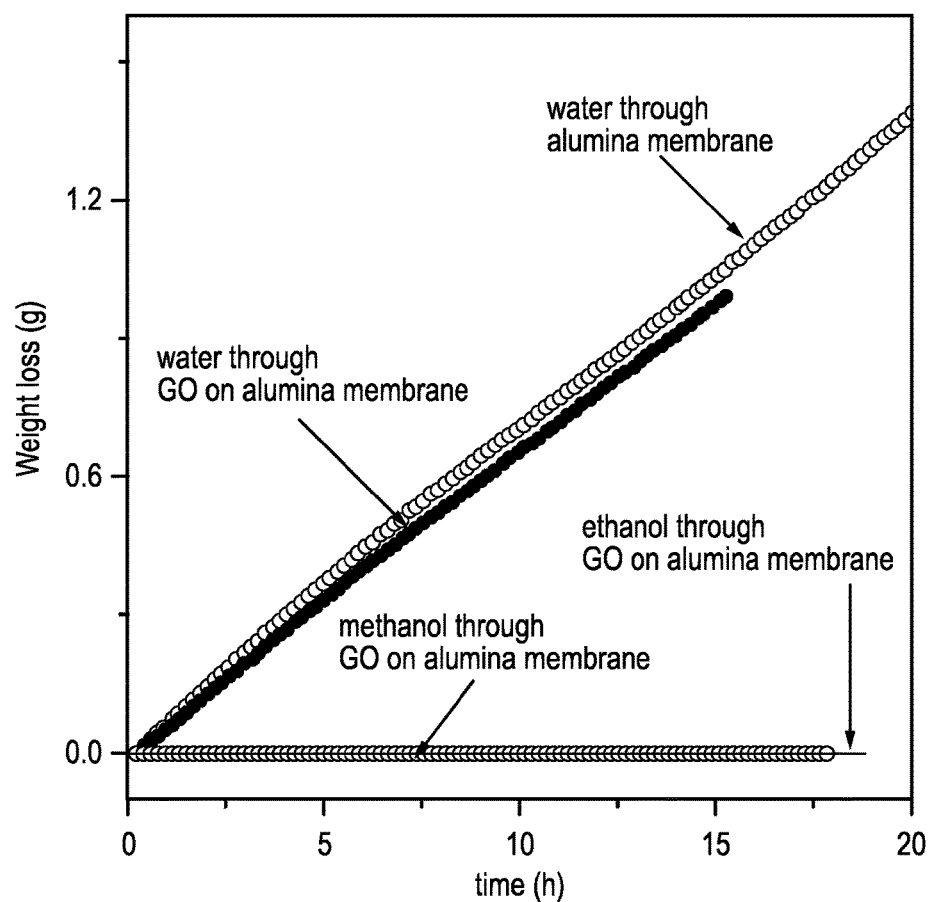
FIG. 3 shows weight loss for a container sealed with a 500 nm thick GO on Anopore membrane (20 mm diameter).

FIG. 3 shows the evaporation rates. As can be seen, the evaporation rate through the GO on Anopore composite and the reference Anopore membrane are practically the same. On the other hand the GO on Anopore composite is completely impermeable to the methanol and ethanol vapours.

Example 3

This example shows 2-propanol permeation through supported GO membranes.

To enhance the mechanical stability of GO membranes, we have deposited graphene oxide on different polymer/ceramic porous support and studied their influence on the graphene oxide's membrane property. We have used anodisc alumina, Polytetrafluoroethylene (PTFE), Polyvinylidene fluoride (PVDF) and Cyclopore Polycarbonate (PC) support. We measured the vapour permeation of 2-propanol (2-propanol leak test) at room temperature and room humidity to study the influence of support membrane on property of graphene oxide membrane. Table 1 below shows the 2-propanol leak test performed for GO on different support membranes. The porosity of all the support membranes was identical and for each was 200 nm so that a direct comparison could be made. The table demonstrates that the support material has an effect on graphene oxides membrane properties. The best substrate found so far is the Anodisc alumina membrane. Graphene oxide on Anodisc alumina shows the same property as that of a free standing graphene oxide (impermeable to propanol).

TABLE 1

Propanol leak test for graphene oxide (4 µm thick) on different support membranes

| Support porous support (200 nm pore) | Flux without GO coating mg/h/cm$^2$ | Flux with GO coating mg/h/cm$^2$ | Hydrophilicity/ hydrophobicity | Smoothness |
|---|---|---|---|---|
| PTFE | 12.8 | 2.6 | hydrophobic | Rough |
| PVDF | 13.7 | 2.1 | hydrophilic | Smooth |
| Cyclopore Polycarbonate | 28.8 | 1.0 | hydrophilic | Smooth (smoother than PVDF) |
| Anodisc alumina | 30.6 | undetectable | hydrophilic | Very smooth |

It can also be seen that the propanol vapour barrier for GO on cyclopore Polycarbonate (PC) membranes were found better than that of PTFE and PVDF. Four micron thick GO coating on PC membranes increase the propanol barrier nearly 30 times compared to five and seven times improvement for PTFE and PVDF membranes. Table 1 also shows smoothness of different GO coating on different support obtained by microscopic or visual inception. In general very smooth hydrophilic substrates are found to be a better candidate for GO support material.

Figure 4:
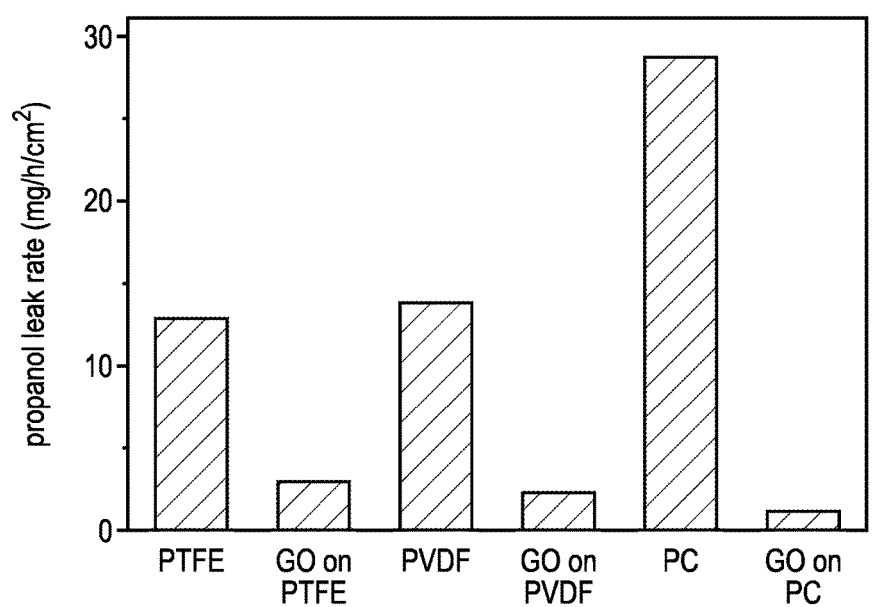
FIG. 4 shows the propanol leak rate for different support membranes with and without GO coating.

FIG. 4 shows the propanol leak rate for different support membranes with and without a GO coating.

Supported GO membranes for Dehydration/concentration
8 micron thick GO on Anodisc alumina membrane $$\text{Separation factor} = \frac{(Y_i/Y_j)}{(X_i/X_j)}$$

Where X is the weight fraction of components i and j in the feed and Y is the weight fraction of a component in the permeate

| Feed sample | Initial alcohol concentration wt % | Total flux gm$^{-2}$h$^{-1}$ | Water flux gm$^{-2}$h$^{-1}$ | Alcohol flux gm$^{-2}$h$^{-1}$ | Sep. Factor |
|---|---|---|---|---|---|
| water | 0 | 146.64 | 146.64 | — | — |
| Ethanol | 100 | Undetectable | — | Undetectable | — |
| Ethanol (aq) | 40 | 69.44 | 63.64 | 5.81 | 7.3 |
| 2-propanol (aq) | 40 | 75.71 | 74.96 | 0.75 | 66.9 |
| 1-propanol | 40 | 100.29 | 96.70 | 3.58 | 18.0 |

GO on hydrophobic substrate

| GO thickness (microns) | Feed sample | Total flux gm$^{-2}$h$^{-1}$ | Water flux gm$^{-2}$h$^{-1}$ | 2-propanol flux gm$^{-2}$h$^{-1}$ | Sep. Factor |
|---|---|---|---|---|---|
| 0 | 2-propanol (40% aq) | 136.95 | 41.85 | 95.10 | 0.3 |
| 1 | 2-propanol (40% aq) | 54.52 | 27.60 | 26.92 | 0.7 |
| 3 | 2-propanol (40% aq) | 36.39 | 26.66 | 9.72 | 1.8 |

GO on hydrophilic substrate

| GO thickness (microns) | Feed sample | Total flux gm$^{-2}$h$^{-1}$ | Water flux gm$^{-2}$h$^{-1}$ | 2-propanol flux gm$^{-2}$h$^{-1}$ | Sep. Factor |
|---|---|---|---|---|---|
| 0 | 2-propanol (40% aq) | 41.56 | 21.58 | 19.98 | 0.7 |
| 1 | 2-propanol (40% aq) | 37.51 | 29.35 | 8.17 | 2.4 |
| 5 | 2-propanol (40% aq) | 26.93 | 17.89 | 9.04 | 2.5 |

A separation factor above one corresponds to the membrane enriching the retentate in alcohol and a separation factor lower than one corresponds to the membrane enriching the retentate in water.

There are a number of uses for the composite membranes of the invention having these characteristics e.g. detector devices, the pervaporation of fermentation broths, concentration of liquids (e.g. fruit juices), liquid drying (e.g. of hydrocarbon based fuels), gas drying, gas humidification.

Figure 5:
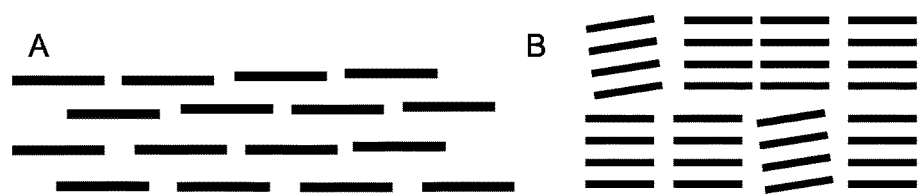
FIG. 5 shows a schematic view of the graphene oxide and graphite oxide layered structures.

Even though the atomic structure and chemical composition of graphene oxide and graphite oxide membranes are same, the membrane properties are very different. For example, bulk graphite oxide membranes (Boehm et al. Journal of Chimie Physique 58, 141 (1961)) allow water and other polar solvents (eg. ethanol) to permeate but it is completely impermeable to all other gases. Graphene oxide on the other hand is completely impermeable to all gases and liquid (including polar solvents) except water. This unique property of graphene oxide membranes is due to its perfect layered structure. Permeation of polar solvents through graphite oxide membranes can be originated from the difference in their layered structure. FIG. 5 below shows schematic view of the graphene oxide and graphite oxide layered structures.

FIG. 5 shows a schematic view of the layered structure of graphene oxide (A) and graphite oxide (B) membranes Graphite oxide membranes are consists of micrometer size thick perfectly staked graphite oxide flakes (defined by the starting graphite flakes used for oxidation, after oxidation it gets expanded due to the attached functional groups)

and can be considered as a polycrystalline material. Exfoliation of graphite oxide in water into individual graphene oxide was achieved by the sonication technique followed by centrifugation at 10000 rpm to remove few layers and thick flakes. Graphene oxide membranes were formed by restacking of these single layer graphene oxides by a number of different techniques such as spin coating, spray coating, road coating and vacuum filtration.

Graphene oxide membranes according to the invention consist of overlapped layers of randomly oriented single layer graphene oxide sheets with smaller dimensions (due to sonication). These membranes can be considered as a centimeter size single crystal (grain) formed by parallel graphene oxide sheets. Due to this difference in layered structure, the atomic structure of the capillary entrance of graphene oxide and graphite oxide membranes are different. For membranes the edge functional groups are located over the functionalised regions of another graphene oxide sheet while in graphite oxide membranes mostly edges are aligned over another graphene oxide edge. These differences unexpectedly may influence the membrane properties of graphene oxide membranes as compared to those of graphite oxide.

The word 'harmful' may mean capable of doing harm. A chemical entity which is harmful to the environment may be a greenhouse gas or it could be harmful or toxic to flora or fauna or other organisms. A harmful chemical entity might be one that is considered harmful according to an accepted international safety standard. For instance it could be a chemical entity which has been assigned a risk code described as 'harmful' as defined in Annex III of European Union Directive 67/548/EEC, i.e. has been afforded a risk code selected from R20, R21, R22 or R52.

The word 'toxic' may mean capable of causing death, illness or injury. A toxic chemical entity might be one that is considered toxic or very toxic according to an accepted international safety standard. For instance it could be a chemical entity which has been assigned a risk code described as toxic or very toxic as defined in Annex III of European Union Directive 67/548/EEC, i.e. has been afforded a risk code selected from R23, R24, R25, R26, R27, R28, R50, R51, R54, R55, R56 or R57.

A detector system is a system which is used for the detection of one or more chemical entities. It will comprise a detector. The composite materials of the present invention are particularly useful in combination with a detector which can be damaged by water or which requires the product which is being detected to be present at a certain concentration.

The term chemical entity is not intended to exclude biological entities, nor is it intended to exclude radioactive material. A chemical entity may by organic or it may be inorganic.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of separating water from a product, the method comprising:
    contacting a mixture of the water and the product with a first surface of a graphene oxide membrane, wherein the graphene oxide membrane comprises a layer of graphene oxide supported on a layer of a porous membrane; and wherein the layer of graphene oxide comprises a stack of a plurality of randomly oriented single molecular graphene oxide layers;
    removing the water from a second surface of the graphene oxide membrane.

2. The method of claim 1, wherein the layer of graphene oxide layer is between 100 nm and 10 μm thick.

3. The method of claim 1, wherein the porous membrane comprises a polymer.

4. The method of claim 1, wherein the porous membrane comprises an inorganic material.

5. The method of claim 4, wherein the inorganic material is a ceramic.

6. The method of claim 4, wherein the inorganic material comprises alumina.

7. The method of claim 1, wherein the mixture of the water and the product is a gaseous mixture of water vapour and the product, the product being a gas.

8. The method of claim 7, wherein the method is a method of detecting a gaseous product and, once the water has passed through the graphene oxide membrane, the method comprises the step of detecting the product.

9. The method of claim 1, wherein the method is a method of separating the water from the product by pervaporation.

10. The method of claim 9, wherein the mixture of the water and the product is a fermentation broth or has been extracted from a fermentation broth.

11. The method of claim 1, wherein the porous membrane is formed of a polymeric material selected from polytetrafluoroethylene(PTFE), poly(vinylidene difluoride) (PVDF) and cyclopore polycarbonate.

12. The method of claim 1, wherein the porous membrane has a surface roughness which is the same as or smoother than as polytetrafluoroethylene(PTFE).

13. The method of claim 1, wherein the ratio of the thickness of the graphene oxide layer to the thickness of the porous membrane is in the range from 10:1 to 1:10.

14. The method of claim 1, wherein the porous membrane is no more hydrophobic than polytetrafluoroethylene(PTFE).

* * * * *